United States Patent
Chen et al.

(10) Patent No.: US 9,052,751 B2
(45) Date of Patent: Jun. 9, 2015

(54) VISUAL LASER TOUCHPAD FOR MOBILE TELEPHONE AND METHOD

(75) Inventors: Rui Chen, Beijing (CN); Chao Chen, Beijing (CN)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 242 days.

(21) Appl. No.: 13/055,312

(22) PCT Filed: Aug. 17, 2009

(86) PCT No.: PCT/CN2009/001007
§ 371 (c)(1),
(2), (4) Date: Jan. 21, 2011

(87) PCT Pub. No.: WO2010/017696
PCT Pub. Date: Feb. 18, 2010

(65) Prior Publication Data
US 2011/0130159 A1 Jun. 2, 2011

(30) Foreign Application Priority Data
Aug. 15, 2008 (CN) .......................... 2008 1 0215495

(51) Int. Cl.
*G06F 3/0488* (2013.01)
*H04W 88/02* (2009.01)
(Continued)

(52) U.S. Cl.
CPC .......... *G06F 3/0317* (2013.01); *G06F 3/04883* (2013.01); *H04N 9/3161* (2013.01); *H04N 9/3173* (2013.01); *H04M 1/0272* (2013.01)

(58) Field of Classification Search
USPC .......... 345/158, 168, 169, 175; 382/123, 187; 348/333.1; 353/69
See application file for complete search history.

(56) References Cited

U.S. PATENT DOCUMENTS 6,647,145 B1* 11/2003 Gay .............................. 382/187
6,721,452 B2* 4/2004 Confer et al. ................. 382/197
(Continued)

FOREIGN PATENT DOCUMENTS

CN 1269658 A 10/2000
CN 1322329 A 11/2001
(Continued)

OTHER PUBLICATIONS

Sprint Online User's Guide—Dual-Band Tri Mode PCS Phone Model SPH-i330 (Samsung) Copyright 2002.*
(Continued)

*Primary Examiner* — Philip Sobutka
(74) *Attorney, Agent, or Firm* — Renner, Otto, Boisselle & Sklar, LLP

(57) ABSTRACT

Portable electronic communication equipment, e.g., a mobile phone, includes a projector that is integrated into the mobile phone to project images, a camera senses views, including a view of projected images and of changes made to the projected image, e.g., by inserting an object, such as a finger, stylus, etc., into the projected image. The character of the changes, e.g., where a change occurs in an image, can be used as an input to the mobile phone. A method of using a portable communication device includes transmitting and receiving communications via a radio, projecting an image onto a surface, using a camera of the portable communication device to sense views including a view of a projected image by the projector, and detecting a change in the sensed view of the projected image to provide an input to the portable communication device.

20 Claims, 6 Drawing Sheets

(51) Int. Cl.
*G06F 3/03* (2006.01)
*H04N 9/31* (2006.01)
*H04M 1/02* (2006.01)

(56) References Cited

U.S. PATENT DOCUMENTS

| | | | |
|---|---|---|---|
| 7,006,079 B2 * | 2/2006 | Kidode et al. | 345/173 |
| 7,084,857 B2 * | 8/2006 | Lieberman et al. | 345/168 |
| 7,242,388 B2 * | 7/2007 | Lieberman et al. | 345/158 |
| 7,307,661 B2 * | 12/2007 | Lieberman et al. | 348/333.1 |
| 7,959,300 B2 * | 6/2011 | Hirahara et al. | 353/69 |
| 2006/0077188 A1 | 4/2006 | Byun | |
| 2007/0063979 A1 | 3/2007 | Tran | |
| 2007/0081728 A1 * | 4/2007 | Park et al. | 382/190 |
| 2008/0010317 A1 | 1/2008 | Tokai | |
| 2008/0018591 A1 | 1/2008 | Pittel et al. | |
| 2010/0021022 A1 * | 1/2010 | Pittel et al. | 382/123 |

FOREIGN PATENT DOCUMENTS

| | | |
|---|---|---|
| CN | 1767559 A | 5/2006 |
| CN | 101006720 A | 7/2007 |
| EP | 1 785 818 A2 | 5/2007 |
| EP | 1 785 818 A3 | 7/2012 |

OTHER PUBLICATIONS

International Search Report corresponding to PCT/CN2009/001007, mailed Nov. 26, 2009.
Written Opinion corresponding to PCT/CN2009/001007, mailed Nov. 26, 2009.
International Preliminary Report on Patentability corresponding to PCT/CN2009/001007, completion of report Nov. 11, 2010.
Extended European Search Report, corresponding to EP 09 80 6299, search dated Jun. 13, 2013.

* cited by examiner

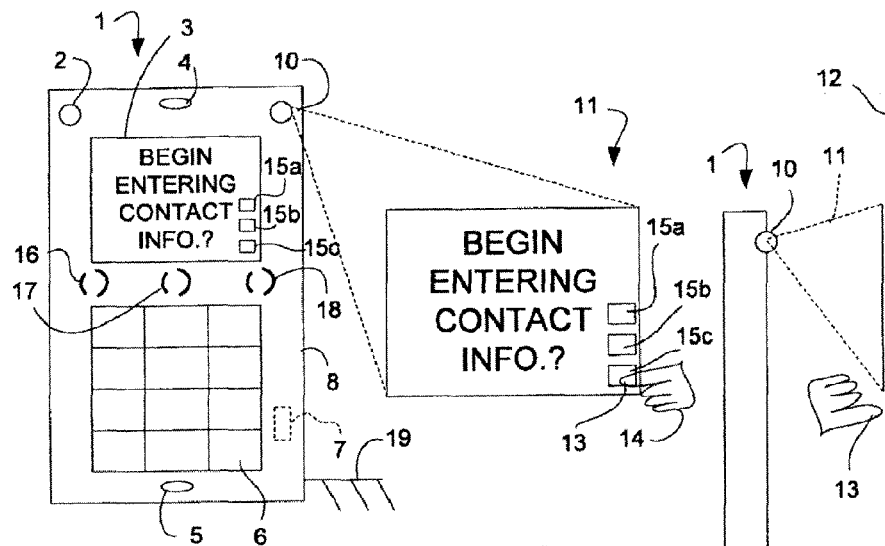
FIG. 1
FIG. 2
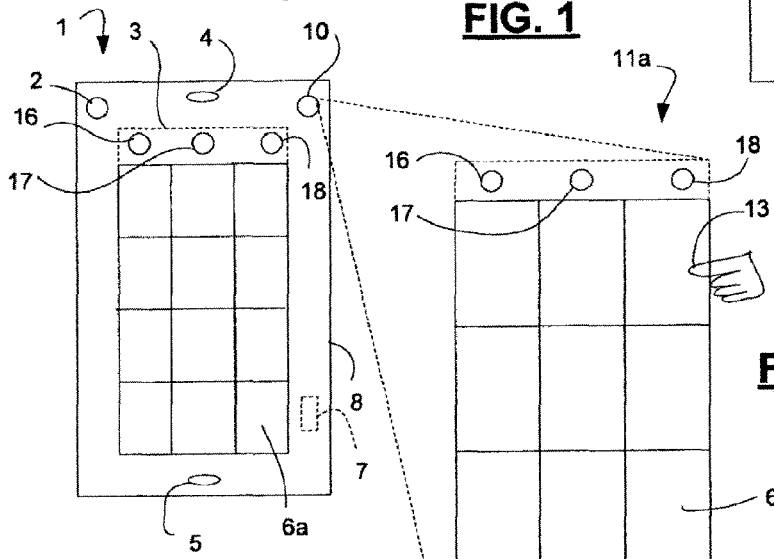
FIG. 3
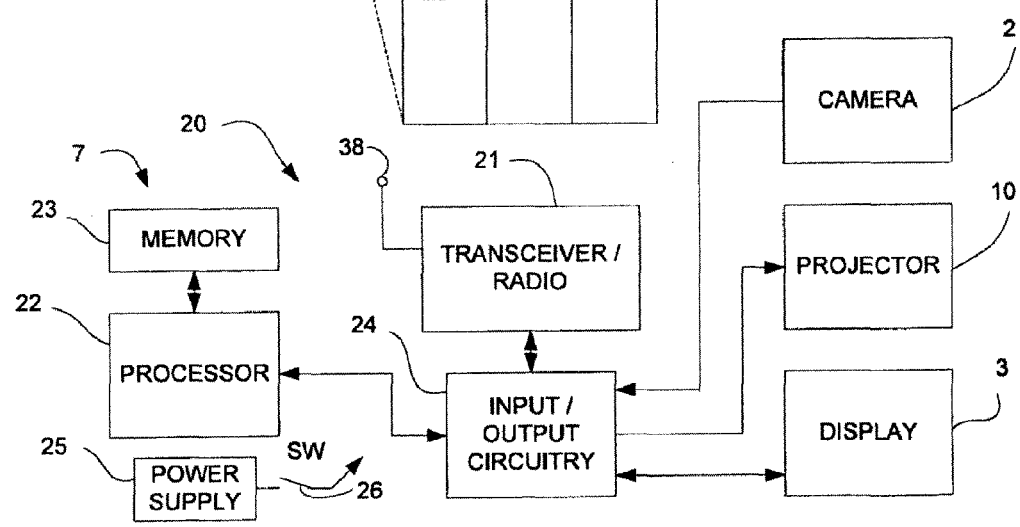
FIG. 4

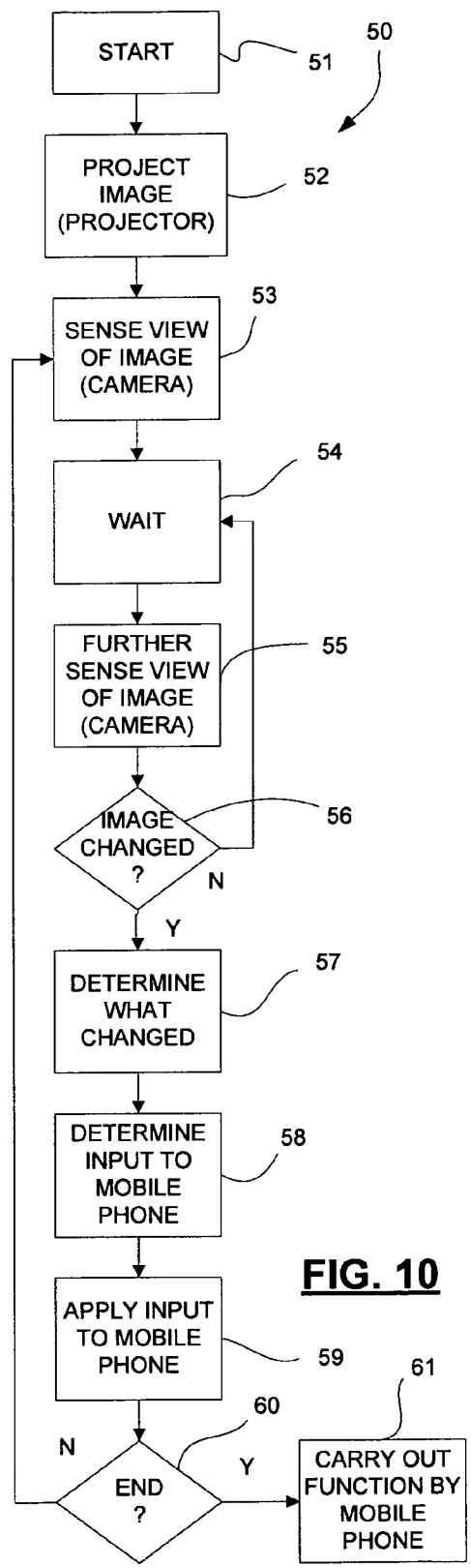
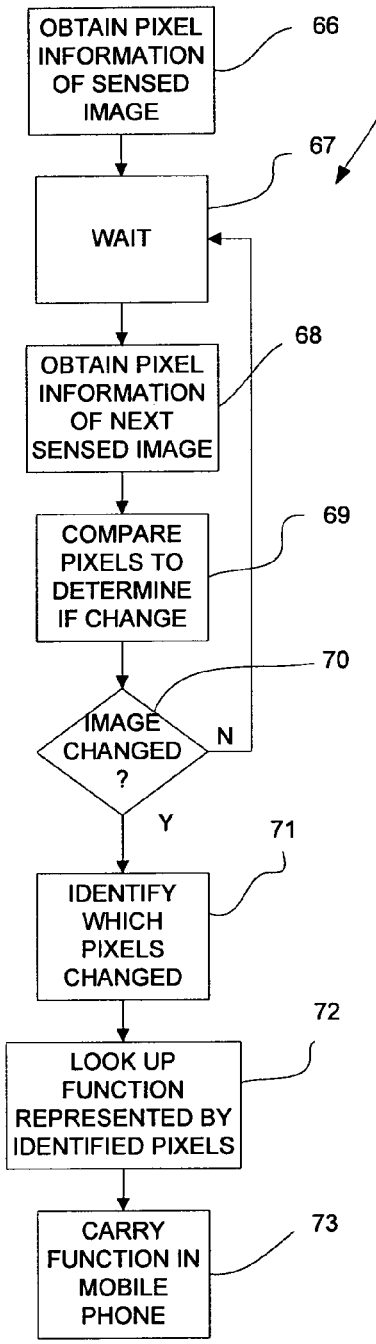
FIG. 10
FIG. 11

VISUAL LASER TOUCHPAD FOR MOBILE TELEPHONE AND METHOD

TECHNICAL FIELD

The present invention relates generally to portable electronic communication equipment with a visual laser touchpad and method and, more particularly, to a mobile telephone with a laser projection display that may be configured and used in a number of ways and associated methods.

BACKGROUND

Mobile and/or wireless electronic devices are becoming increasingly popular. For example, mobile telephones, portable media players and portable gaming devices are now in wide-spread use. In addition, the features and accessories associated with certain types of electronic devices have become increasingly diverse. To name a few examples, many electronic devices have cameras, text messaging capability, Internet browsing capability, electronic mail capability, video playback capability, audio playback capability, image display capability and hands free headset interfaces.

Portable communication devices, e.g., mobile telephones, personal digital assistants, etc., with touchpad displays (also sometimes referred to as touch sensitive displays or touch screen displays) are becoming more common. Some mobile telephones have a physical keypad with keys that may be pressed to dial a telephone number, to initiate a telephone call, to answer an incoming telephone call, and/or to carry out other functions. Some other mobile telephones do not even have a keypad separate from the display; rather the display is a touch sensitive display, and the display and associated circuitry of the mobile telephone are sufficiently versatile to display a keypad when it is desired to dial a telephone number, initiate or answer a telephone call, and/or to carry out other functions and to sense when respective portions, e.g., icons, numbers, buttons, displayed keys, etc., are touched by the user.

Mobile telephones and other portable electronic communications equipment, e.g., personal digital assistants, etc., are relatively small, and the displays thereof are relatively small. It is difficult for more than one person clearly to view the display of such equipment.

SUMMARY

Briefly, in accordance with an aspect of the invention, a portable electronic equipment, for example, a mobile phone, integrates a visual laser touchpad, including a projector that may be operated to project an image of a touchpad in the form of a keypad, a photograph, information, artwork, etc., a camera that is operable to sense views including a view of the image projected by the projector, and a control that is operable to respond to information representative of the view sensed by the camera to provide an input to the electronic equipment representative of desired operation, function or the like of the electronic equipment.

According to an aspect of the invention, portable electronic equipment includes a projector adapted to project an image, a sensing device adapted to sense views including a view of a projected image by the projector, and a control adapted to respond to a change in the sensed view of the projected image to provide an input to the portable electronic equipment.

According to another aspect, the portable electronic equipment includes or is a mobile telephone including a radio adapted to transmit and receive communications.

According to another aspect, the projector includes a laser projector.

According to another aspect, the control is adapted to sense a change representative of an object presented in the path of the projected image.

According to another aspect, wherein the sensing device is a camera that is adapted to sense a change in the sensed view representative of an object presented in the path of the projected image.

According to another aspect, one image is compared with a subsequently sensed image to determine whether an object is present in the sensed image and/or whether the object is moving.

According to another aspect, the control is adapted to cause the projector to project an image representative of the result of an object being present and/or being moved.

According to another aspect, the portable electronic equipment includes a display.

According to another aspect, the display includes a touch sensitive display.

According to another aspect, the control is operable to show on the display the result of the change in the sensed view.

According to another aspect, the control is adapted to cause the projector and the display to provide the same image.

According to another aspect, the projected image includes an image of at least one control button, and wherein the control is responsive to sensing of an object touching an image of the control button to provide an operative response thereto.

According to another aspect, the control or the sensing device is adapted to capture a projected image.

According to another aspect, the control is adapted to store the captured image.

According to another aspect, the control is adapted to transmit the captured image for receipt by another portable electronic equipment.

According to another aspect, the portable electronic equipment includes at least one of a Blue Tooth device, radio frequency device or beaming device to transmit the captured image to another portable electronic equipment.

According to another aspect, the control is adapted to detect a change in the sensed image based on manual input by one or more persons.

According to another aspect, the mobile telephone includes a housing, the housing at least partly containing the radio, projector, camera and control.

According to another aspect, the portable electronic equipment includes a speaker and a microphone at least partly in the housing.

According to another aspect, the image is a map and the change to the map represents applying information to the map image.

According to another aspect, the change to the map represents writing by one or more persons.

According to another aspect, the projected image is viewable by more than one person.

According to another aspect the change in the projected image is a character written in the projected image, and wherein the control includes a decoder to recognize the character.

According to another aspect, the portable electronic equipment includes messaging function in the portable electronic equipment and the control is operable to include the character in a text message.

According to another aspect, the sensing device is a camera.

According to another aspect of the invention, a method of using a portable communication device includes projecting an image onto a surface, using a sensing device of the portable communication device to sense views including a view of a projected image by the projector, and detecting a change in the sensed view of the projected image to provide an input to the portable communication device.

According to another aspect, the method includes manually touching the projected image to provide an input to the portable communication device.

According to another aspect, the manually touching includes drawing.

According to another aspect, the manually touching comprising touching a control button.

According to another aspect, using a camera as the sensing device and the method includes capturing the image sensed by the camera.

According to another aspect, the method includes writing on the image and transmitting the image, including the writing, as sensed by the camera to another device.

According to another aspect, the method further includes transmitting and receiving communications via a radio.

According to another aspect, the method includes writing a character on the projected image, and using the camera capturing the character for further use, storage or display.

According to another aspect the writing includes moving a finger, stylus or other object in the path of light forming the image on a surface.

According to another aspect, the character is a language character.

According to another aspect, the method further includes recognizing the character and placing it in a text input field of a document.

According to another aspect, the document is an electronic document capable of being at least one of displayed or printed.

According to another aspect, the method further includes using the character in an SMS text message.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

In the annexed drawings:

FIG. 1 is a schematic front view of a portable electronic device, e.g., in the form of a mobile telephone and an image projected from the device; for convenience the portable electronic device will be referred to below as a mobile phone or mobile telephone;

FIG. 2 is a side elevation view of the mobile phone of FIG. 1 illustrating the image projected onto a surface;

FIG. 3 is a schematic front view of another embodiment of mobile phone and an image projected from the mobile phone;

FIG. 4 is a schematic system diagram of parts of the mobile phone showing exemplary functional interconnection of the parts thereof;

FIG. 10 is an exemplary logic diagram or computer flow chart (or routine) for carrying out the function of projecting an image, determining whether the projected image was changed, and in response to a change carrying out a function of the mobile phone;

FIG. 11 is an exemplary logic diagram or computer flow chart (or routine) for carrying out the function of determining whether a sensed view of the projected image has been changed.

DESCRIPTION

Figure 5:
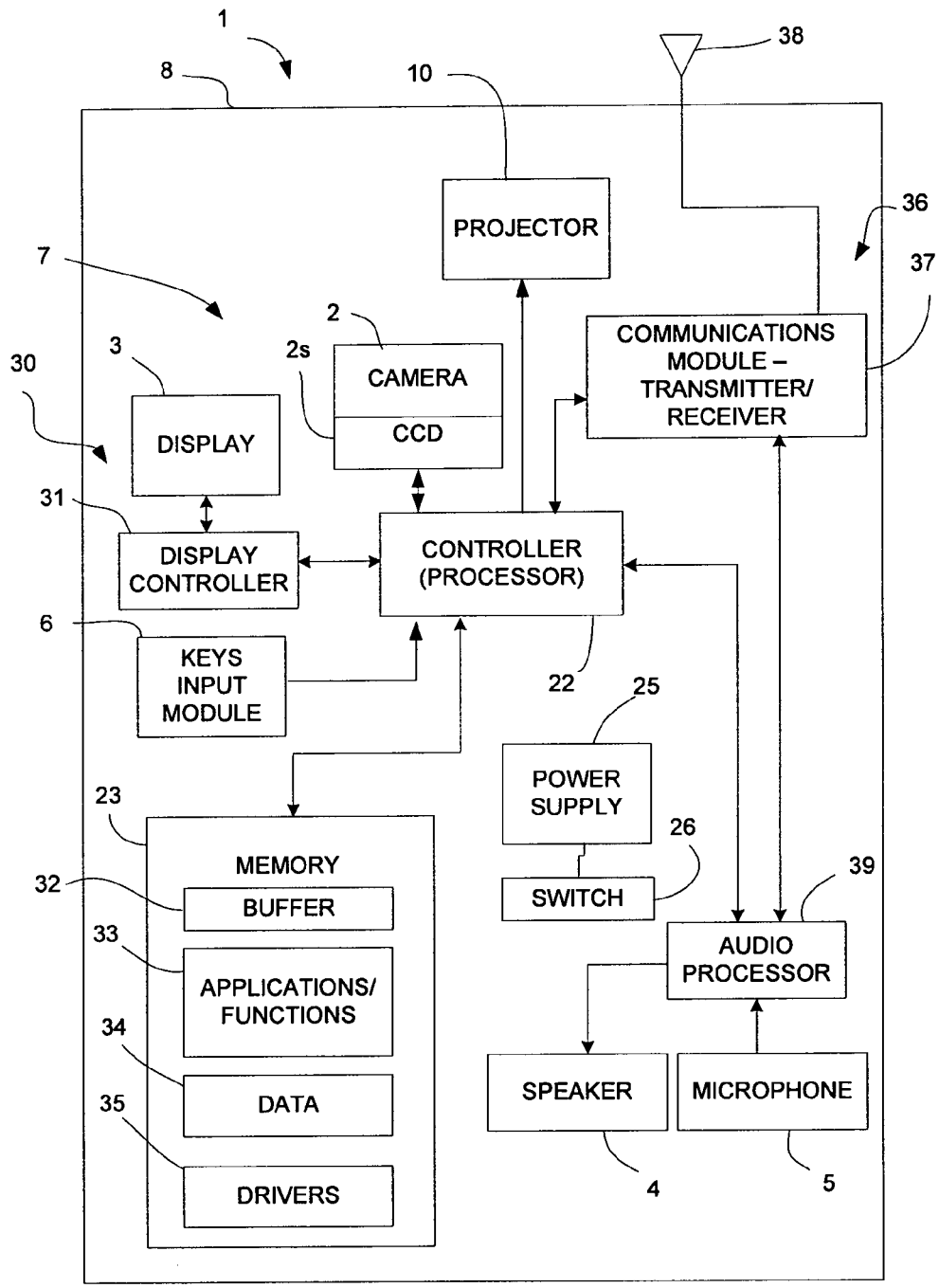
FIG. 5 is a schematic system diagram of circuitry and associated parts of the mobile phone for carrying out operation thereof in a manner described below.

The interchangeable terms "electronic equipment" and "electronic device" include portable radio communication equipment. The term "portable radio communication equipment," which hereinafter may be referred to as a "mobile radio terminal," as "portable electronic equipment," or as a "portable communication device," includes all equipment such as mobile telephones, pagers, communicators, electronic organizers, personal digital assistants (PDAs), smartphones, portable communication apparatus or the like.

In the present application, embodiments of the invention are described primarily in the context of a portable electronic device in the form of a mobile telephone (also referred to as "mobile phone"). However, it will be appreciated that the invention is not intended to be limited to the context of a mobile telephone and may relate to any type of appropriate electronic equipment, examples of which include a media player, a gaming device, PDA and a computer, digital cameras, etc.

Referring in detail to the drawings, and initially to FIGS. 1-4, portable electronic equipment in the form of a mobile phone in accordance with an embodiment of the present invention is illustrated generally at 1. The mobile phone 1 includes a camera 2, display 3, speaker 4, microphone 5, keypad 6, and operating circuitry 7, some or all of which may be entirely or partly contained in or mounted with respect to a housing or case 8. The operating circuitry 7 or part of the operating circuitry may be referred to below as a control or controller, e.g., to control various parts and/or functions of the mobile phone 1. As is described further below, the control 7 is adapted to respond to a change in the sensed view of the projected image obtained by the camera 2 to provide an input to the portable electronic equipment.

In the description the camera 2 is mentioned as sensing images so that both the images and changes in the images can be sensed, detected, determined, etc. It will be appreciated that more broadly another type of sensing mechanism or sensing device may be used to sense images, changes in images, etc. One example may be a device that senses an object by reflection of sound or of other electromagnetic energy. Another example is a radar device or even an induction or capacitance device that sense electrical parameters. In the description and in the claims reference to the term camera includes such other sensing devices that currently exist or may come into existence in the future.

In outward appearance, for example, as is illustrated in FIGS. 1 and 2, the mobile phone 1 is of one type of design or style, e.g., rectangular block or brick shape; however, the features of the invention, as are described in further detail below, may be used in other types of mobile phones, such as those that include cases that open and close (sometimes referred to as a "flip phone," "sliding phones," etc.), and various other mobile phones that currently exist or may come into existence in the future.

The mobile phone 1 may be the same as or similar to a conventional mobile phone but additionally includes a projector 10. The projector 10 is integrated in the mobile phone 1 in a manner such that the projector may project an image 11 and the projected image may be sensed by the camera 2. The projected image also may be viewed by the user and/or by one or more other persons. For example, the projector 10 may project the image 11 on a surface 12, such as a wall, screen, table or other surface, so that the image can be viewed. The projector 10 may be, for example, a laser projector, or it may be another type of projector. The operating circuitry 7 may control the projector 10 to project a desired image. The camera 2 may be an electronic camera, digital camera or other cameral, for example, a camera of the type used in mobile phones or another type of camera. The camera 2 may include a charge coupled device (CCD) or other image sensor(s), one or more lenses, filters, shutter and/or aperture devices, etc. The camera 2 senses views including a view of the projected image by the projector 10.

The view of the projected image 11 sensed by the camera 2 may be changed, for example, due to a person placing a finger 13 of a hand 14 on or adjacent the surface 12 on which the image is being projected. Alternatively, the finger 13 may be placed in the path of the projected image 11 spaced apart from the surface 12. Also, if desired, instead of using a finger, a stylus or other object or device may be placed at the surface 12 or otherwise in the path of the projected image 11 to change the image sensed by that would be sensed by the camera 2. As an example, which is described further below, the projected image 11 may be an image of a telephone dialing keypad similar in appearance to the keypad 6 that is mentioned above, and a person may touch sequentially respective keys of the projected keypad image to simulate dialing a telephone number. Using the camera 2 of the mobile phone 1 the respective touched keys of the projected keypad image can be sensed or detected and used as an input to the mobile phone, e.g., to dial a telephone number. Thus, the character of the change to an image can be detected and used as an input to the mobile phone.

A change in view may be sensed by the camera 2. For example, the camera may provide an electrical response, output, signal, etc., representing a sensed image, as is the case for electronic type cameras typically used in mobile phones and/or in other digital camera devices. If an object is inserted into the projected image, e.g., a finger, as was mentioned above, either onto the surface 12 or otherwise in the path of the projected image, the changed image is sensed by the camera, and the output from the camera correspondingly changes. The change in the camera output may be used to provide an input to the mobile phone, as is described further below.

Alternatively or additionally, as another example, the operating circuitry 7 may detect a change in the output from the camera 2 to provide an input to the mobile phone 1. Still as another example, alternatively or additionally, respective images may be stored by the camera 2, by the operating circuitry 7 and/or by a memory, and a comparator or a comparison function of the operating circuitry may detect a change between respective images and may use that detection to provide an input to the mobile phone 1.

It will be appreciated that in operation of the mobile phone 1 the above or other parts and/or methods may be used to sense or to detect a changed image and to use the results of that sensing or detecting as an input to the mobile phone or for some other purpose. For example, the operating circuitry 7 may compare the changed image with a prior image to determine what change had been made. The change may be the pressing or touching a projected image of one or more control buttons 15a, 15b, 15c and/or keys of a keypad; the change may be the drawing a line or other symbol, information or the like on a projected image, the writing of text on a projected image, the drawing of a route on a projected map image; etc. In response to detecting such a change, the operating circuitry 7 may control the mobile phone 1 or one or more parts of the mobile phone to obtain a desired operation or response of the mobile phone.

The display 3 of the mobile phone 1 may be a touch sensitive display that provides to the operating circuitry 7 electrical or other inputs representing touching of respective parts of the display, for example, by a finger, a stylus, etc. The operating circuitry 7 may control or operate the display 3 to show different respective images, such as, for example, text instructions or information (shown in FIG. 1), an image of a keypad 6a (shown in FIG. 3), icons or functions of a graphical user interface (GUI), lists of information, etc., as is known. As shown in FIG. 1, the keypad 6 may be a physical keypad having keys or buttons that are positioned on or in the housing. As an alternative, as shown in FIG. 3, the keypad 6a may be formed as an image on the display 3. The keypad 6, 6a may include one or more soft switches 16, 17, 18, e.g., that may be physical switches mounted on or in the housing 8 or formed on the display 3 by the operating circuitry 7. The switches 16, 17, 18 may be used to answer an incoming telephone call or to initiate a telephone call, e.g., to call the phone of another person, may be used to navigate on the display 4, e.g., to move a cursor shown on the display, to select items shown in a list on the display; etc. The projected control buttons 15a, 15b, 15c may provide functions and operation of the mobile phone 1 in a manner similar to the soft switches 16, 17, 18; or the functions and operations carried out by the mobile phone in response to pressing the soft switches 16, 17, 18 or the control buttons 15a, 15b, 15c may be different. By pointing to a respective control button 15a, 15b, 15c in a projected image 11, a change is made to the projected image; and that change is sensed by the camera and is used to provide an input to the mobile phone, for example, according to the particular function, etc., as represented by the respective control button.

A user of the mobile phone 1 may press or touch respective keys, whether physical keys on keypad 6 (FIG. 1) or displayed keys on keypad 6a (FIG. 3), or may touch respective icons, functions, etc. that are shown on the display 3, to cause the mobile phone 1 to carry out respective operations. Inputs from such pressing or touching, for example, may be provided to the operating circuitry 7. The operating circuitry 7 is a control for the mobile phone 1 and in response to various inputs to the operating circuitry, the operating circuitry may control the mobile phone, e.g., by carrying out the operation or functions of the mobile phone in conventional manner or in manners that will be developed in the future. Several examples of those functions include making a phone call, answering a phone call, sending and receiving text messages and/or email, browsing the Internet or other network, storing, retrieving and/or displaying information images, text, numbers, etc.

As is illustrated in FIGS. 1-3, the projected images 11, 11a are the same as the images shown on the displays 3. However, it will be appreciated that the projected images may be different from the images shown on the displays. The projected images may be information, e.g., text, illustrations, pictures, etc., or they may be interactive images that can be touched, pressed, pointed to, etc., e.g., by a finger or the like, as was described above. The camera 2 senses a view of a projected image and whether there is a change in the view, e.g., caused by a finger pointing to an icon, key, or the like or by the finger writing on the projected image, and so forth. The sensed changed image may provide to an input to the control 7, e.g., the operating circuitry, which controls operation of the mobile phone 1 or of a part of the mobile phone.

If desired, the mobile phone 1 may be placed on a relatively stationary surface or holder that is represented schematically at 19 in FIG. 1 relative to the surface, e.g., screen 12, on which the image 11 is to be projected by the projector 10. The stationary mobile phone 1 will provide a relatively stationary image so that changes in the projected image can be relatively accurately sensed by the camera 2 to determine what is the actual change, what kind of signal, etc., correspondingly should be provided to the mobile phone as a result of such change.

It will be appreciated that a visual laser touchpad is provided by projecting the image, e.g., using a laser projector 10, sensing the projected image by the camera 2 and determining changes in the image to provide an input to the mobile phone 1. For example, if the projected image is an image of a keypad 6a, touching of an image of a key may provide a suitable signal to the mobile phone, e.g., as a representation of a digit in telephone number intended to be dialed, etc. As is described herein, there are many other uses of the visual laser touchpad or other projected touch pad provided by the invention.

The projected image 11 may be the same as or different from the display 3. For example, the display may show information as in FIG. 1, whereas the projected image 11 may show not only the information from the display but also the control buttons 15a, 15b, 15c (FIG. 1).

Also, it will be appreciated that the functions of keys, buttons, etc. of the projected images 11 may be same as the functions of corresponding keys, soft switches, control buttons, etc. on the mobile phone 1 itself or shown in the display 3 of the mobile phone; or such functions may be different. As to what are such functions, the operating circuitry or operational control may be appropriately configured and operative to set such functions or to allow for the user to set such functions.

Turning, now, to FIG. 4, a schematic system diagram 20 of the mobile phone 1 is illustrated. The system 20 includes the operating circuitry 7, the camera 2, display 3 and projector 10. The system 20 also includes a transceiver or radio 21, which may be used to send and to receive wireless telephone communications, text messages, images, photographs, etc. The transceiver 21 also may be used to send and receive email, SMS (short message system) messages, MMS (multimedia message service) messages, etc., to beam from one mobile phone to another, to provide Blue Tooth communications, to provide radio frequency communications; and/or to provide for Internet connection, browsing, etc. As is shown in the example of the system 20 of FIG. 3, the operating circuitry 7 includes a processor 22, e.g., a microprocessor or other processor, a memory 23, and input/output circuitry 24. A power supply 25 may be coupled to the system 20 via a suitable switch 26 to provide electrical power to the various portions of the mobile phone 1. As is illustrated, the camera 2, display 3 and projector 10 are coupled to the operating circuitry 7 via the input/output circuitry 24.

Operation of the camera 2, display 3 and projector 10 may be carried out by the control 7 (operating circuitry), e.g., to carry out the usual functions of the camera and display and also to carry out the functions of the projector 10 to project images as may be desired, such as are described herein and/or other images. The memory may include one or more of an operating system for the mobile phone 1, one or more application programs or functions that may be carried out using the mobile phone, e.g., those functions that are typical in a conventional mobile phone or may come into existence in the future and also the functions described herein. Such functions may include storing images, from the camera, controlling the projector to project images, comparing images to sense a changed image and the extent to which the change occurred, e.g., which key of a projected keyboard image is being touched or "pressed," etc. The memory also may be used to store various data. The processor 22 may operate in response to various inputs provided from the mobile phone in the usual way a mobile phone operates; and the processor also may operate in response to various application programs stored in the memory, for example, cause operation. The processor 22 may control operation of the transceiver, camera, display and projector as described elsewhere herein, for example.

Briefly turning to FIG. 5, a more comprehensive schematic block diagram of the system 20 (also shown in FIG. 4) and the operating circuitry 7 of the mobile phone 1 is illustrated. The illustration is exemplary; other types of circuitry may be employed in addition to or instead of the operating circuitry 7 to carry out the projector 10 projection and camera 2 photographic functions described herein, the various telecommunication and other functions of a mobile phone. The operating circuitry 7 includes a controller 22 (sometimes referred to as a processor or as an operational control and may include a microprocessor or other processor device and/or logic device) that receives inputs and controls the various parts and operation of the operating circuitry. An input module 30 provides inputs to the controller 22. The input module includes the camera 2, a display controller 31, and a keys input module 6 (or 6a).

The camera 2 may include a lens, shutter, image sensor 2s, e.g., a digital image sensor, such as, for example, a CCD (charge coupled device), a CMOS device, or another image sensor. Images that are sensed by the image sensor may be provided the controller 22 for use in the manner described herein. The display controller 31 responds to inputs from a touch sensitive display 3 or from another type of display that is capable of providing inputs to the controller. Thus, for example, touching of a stylus or a finger to a part of a touch sensitive display, e.g., to select a song in a displayed list of songs, to select a contact in a displayed list of contacts, to select an icon or function in a GUI shown on the display may provide an input to the controller in conventional manner. The display controller 31 also may receive inputs from the controller 22 to cause images, icons, information, keypad 6a, etc., to be shown on the display 3. The keys input module 6, for example, may be the physical keys or images of keys, e.g., as were described above, and/or may be signal conditioning, decoding or other appropriate circuitry to provide to the controller 22 information indicating the operating of one or more keys in conventional manner.

The memory 23 is coupled to the controller 22. The memory may be a solid state memory, e.g., read only memory (ROM), random access memory (RAM), SIM card, etc., or memory that maintains information even when power is off and that can be selectively erased and provided with more data, an example of which sometimes is referred to as an EPROM or the like. The memory may be some other type device. The memory 23 includes a buffer memory 32 (sometimes referred to herein as buffer). The memory 23 may include an applications or functions storing section or function 33 to store applications programs and functions programs or routines for carrying out operation of the mobile phone 1 via the controller 22. The memory 23 also may include a data storage section or function 34 to store data, e.g., contacts, numerical data, pictures, and/or virtually any other data for use by the mobile phone 1. A drivers section 35 of the memory 34 may include various drivers for the mobile phone 1, for communication functions and/or for carrying out other functions of the mobile phone. The memory 23 may be used to save photographs from the camera 2 and/or images of views of projected images from the projector 10 and/or as modified or changed in various manners such as are described, for example, herein. The portions of the memory 23 may be separate memory devices or may be a respective address sections of one or more memory devices.

The mobile phone 1 includes a telecommunications portion 36, including a communications module-transmitter/receiver 37, such as the transceiver/radio 21 (FIG. 4) that receives incoming signals and transmits outgoing signals via antenna 38. The communications module-transmitter/receiver 37 is coupled to the controller 22 to provide inputs to and to receive output signals, as may be the case in conventional mobile phones. The communications module-transmitter/receiver 37 also is coupled to the speaker 4 and microphone 5 via an audio processor 39 to provide audio output via the speaker and to receive audio input from the microphone for usual telecommunications functions. The speaker 4 and microphone 5 enable a user to listen and to speak via the mobile phone 1. Audio data may be passed to the audio processor 39 from the memory 23 via the controller 22 for playback to the user. The audio data may include, for example, audio data from an audio file stored in the memory 23 and retrieved by the controller 22. The audio processor 39 may include any appropriate buffers, decoders, amplifiers and the like.

For telecommunication functions and/or for various other applications and/or functions as may be selected from a GUI, the mobile phone 1 may operate in a conventional way. For example, the mobile phone may be used to make and to receive telephone calls, to play back songs, pictures, videos, movies, etc., to take and to store photographs or video, to prepare, to save, to maintain, and to display documents and databases such as a contacts or other database, to browse the Internet, to maintain a calendar, etc.

Turning to FIGS. 6, 7 8 and 9, several examples of embodiments of mobile phone 1 and methods of using the mobile phone are illustrated and are described below. Operation of the mobile phone 1 in these examples is similar to the operation described above.

Figure 6:
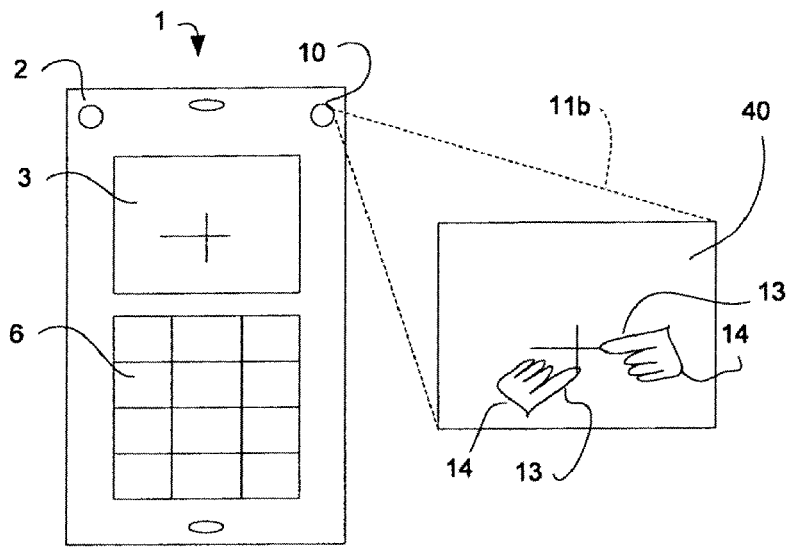
FIG. 6 is a schematic front view of a mobile phone and a projected image showing the possibility of manually drawing or touching the projected image to be sensed by the camera of the mobile phone.

In FIG. 6 the mobile phone projects an image 11b. The image may begin as simply a blank image without any features, and a user may draw in the blank space using one or more fingers, a stylus, etc., e.g., as one might draw directly on a touch sensitive drawing tablet type of display. The image 11b may be a drawing, text or an image of anything else. Two hands 14 and fingers 13 are illustrated. The hands may be used to draw on the image 11b. The drawing 40, for example, may be made by one or two hands of one person or by one or two hands of several people simultaneously or separately. The drawing may be a picture created by the person(s), e.g., as on a drawing tablet type of touch sensitive display, or the drawing may be underlining or highlighting of text or some other drawing entry onto a preexisting drawing that is in the projected image from the projector. Using the operating circuitry as was described above, the lines, highlighting, other drawing characteristics may be sensed by the camera 2 as it views the image projected by the projector 10; and the image as changed may be captured by the operating circuitry and saved in the memory 23. The image as changed may be subsequently retrieved by the operating circuitry to be shown on the display 3 and/or to be projected for viewing.

If desired, the writing or drawing may be carried out on the display 3 in the several embodiments, e.g., as a user uses a finger or stylus, for example, to draw an image on the screen or to alter an image on the screen. The projector 10 may project the image onto a surface 12, for example, and the user or one or more other people may view the projected image. Furthermore, if desired, a projected image may be sensed by the camera 2 and stored, transmitted, etc., as described elsewhere herein.

It will be appreciated that the various drawing that may be carried out using the mobile phone 1 and the various features described herein allows use of the mobile phone as a blackboard or white board to provide images to the user and/or to others for viewing. One user may prepare a picture, e.g., draw the picture using the blackboard or white board or other drawing function of the invention; and another person may add to or change the drawn image. One person may draw an image or retrieve an image from memory and may project the image for viewing by others and for possible discussion. The initial user or another person or persons may make changes to the image; the image may be captured and transmitted to others for further careful review, discussion, revising, etc.

Figure 7:
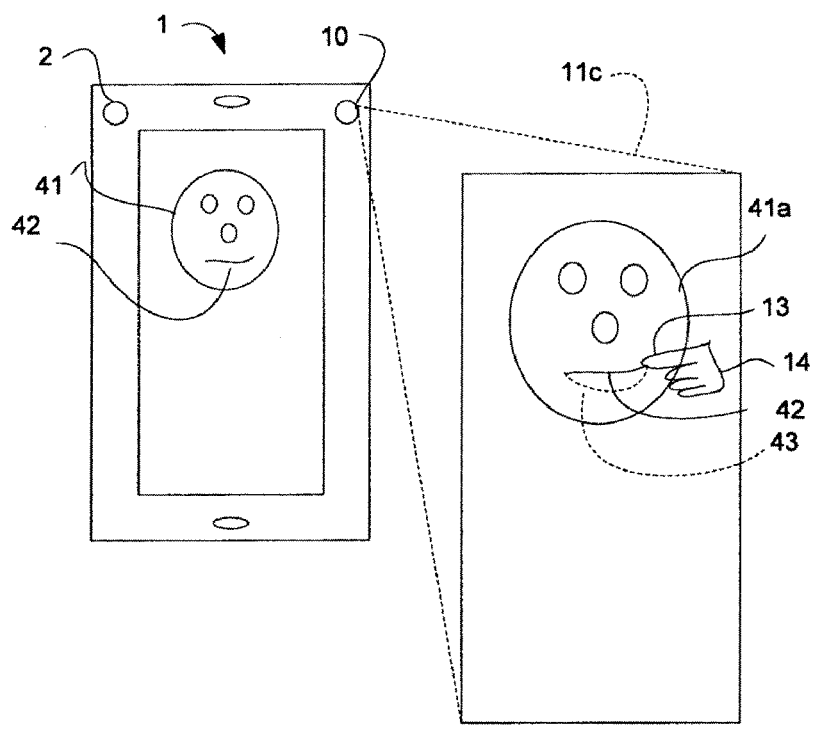
FIG. 7 is a schematic front view of a mobile phone and a projected image illustrating manually drawing on the projected image.

In FIG. 7 the mobile phone 1 shows on the display 3 and projects as image 11c an image that is obtained from memory 23 or is provided by beaming, Blue Tooth, radio frequency or other connection to another device. In the image 41 shown on the display 3 is a face 41 having a quiet looking mouth 42. The image of that same face would be projected onto the screen 12

(FIG. 2), for example. However, as is shown in the projected image 11c, the face 41a has an additional portion 43 drawn onto the mouth 42a making the face look more as though smiling. It will be appreciated that the image shown on the display 3 and projected as image 11c may be the same, but they are shown differently here to provide an example of how a photograph that was stored in memory 23 may be changed by drawing on the projected image of the face using features of the invention.

Figure 8:
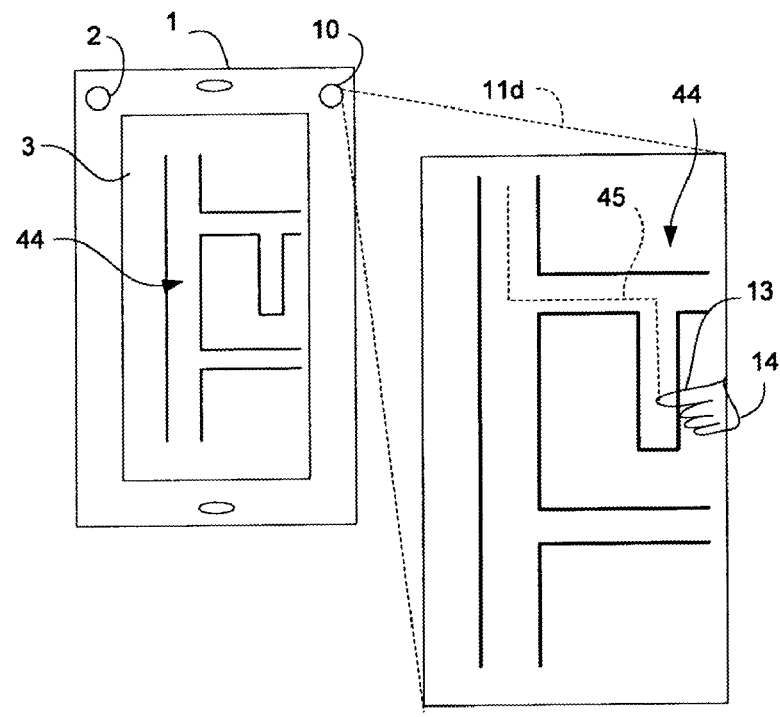
FIG. 8 is a schematic front view of a mobile phone and a projected image in the form of a map with manual drawing on the map, the mobile phone illustrating a representation of transmitting the map to another device.

In FIG. 8 an example of using the invention to provide directional instructions, e.g., driving instructions. The mobile phone 1 has a map 44 shown on the display 3 and also projected as image 11d. The map may be a street map or another type of map. The user of the mobile phone may use the projector 10 of the mobile phone to project an image 11d of the 44 for his or her own use, e.g., providing a larger image than is shown on the display 3 thereby to facilitate viewing of the map. The user also may mark on the projected image 11d of the map 44 a desired route, which is represented by dash line 45, along one or more respective streets to reach a destination, for example. The user may project the image 11d, including the map 44 and the route 45, so that another person or persons may view the map and route, thereby to provide driving instructions to guide the other person to an intended location. As another alternative, while or after the user would draw the route 45 on the image 11d of the map 44, the changed image as sensed by the camera 2, including the map and the route, may be captured by the processor, for example, and saved in memory 23 and/or transmitted to another person. Such transmitting may be carried out using Blue Tooth, beaming, radio frequency transmission, email, SMS or MMS, or some way to provide the directions to the recipient of the transmission.

Any of the images that are sensed by the camera 2 may be captured and saved in memory 23 or in some other part of the operating circuitry 7, for example. Also, any of the images may be transmitted to another electronic communication device, such as a mobile phone, PDA, etc., or to a computer, printer, etc.

Figure 9:
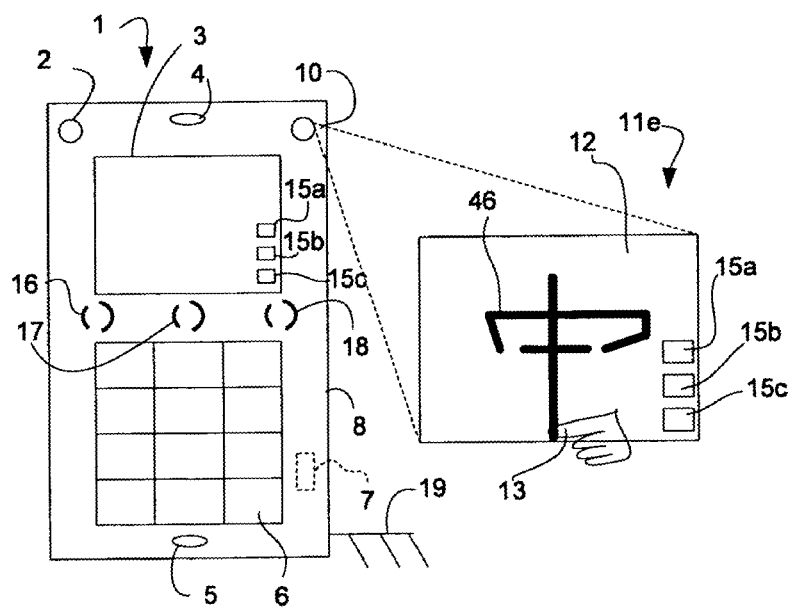
FIG. 9 is a schematic front view of a mobile phone and a projected image in the form of a blank image on which a character or other picture may be drawn.
Figure 12:
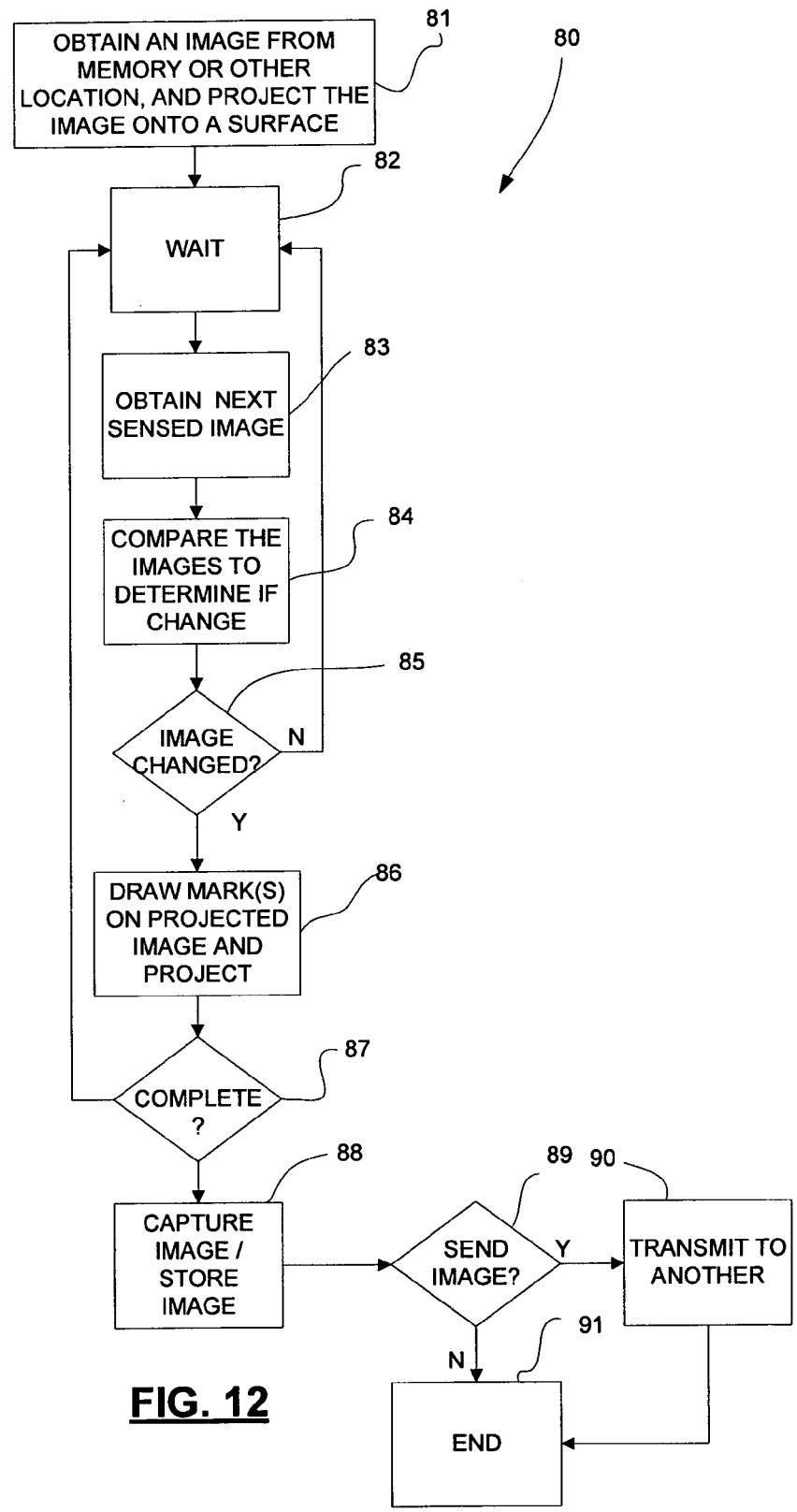
FIG. 12 is an exemplary logic diagram or computer flow chart (or routine) for carrying out the function of drawing or writing on a projected image.

Turning briefly to FIG. 9, another embodiment of mobile phone 1 is illustrated for use in creating, storing and/or using or displaying characters 46. As one example a character 46 may be a Chinese character used in a dialect of the Chinese language, e.g., Mandarin Chinese. The mobile phone 1 projects a blank image 11e onto the screen 12. A user may write or draw a character on the projected image 11e by moving a finger 13 in the area of the image. The camera 2 senses the placing of the finger in the image and/or movement of the finger so that the changes in the image are used to create lines or patterns that can be captured by the camera and/or by the operating circuitry 22. The lines or patterns in the illustrated embodiment form a Chinese character shown at 46 in FIG. 9. Clearly other characters also may be formed in this way, e.g., moving a finger, stylus or other object in the area of the image 11e.

The control, e.g., the operating circuitry 22, may recognize the character 46 and convert that character to an electronic form that can be used as a character in a message, such as an SMS message, MMS message, email, etc. or for use in a document and/or for display on the display 3 as part of a text message or as a text character for various uses in documents, messages, etc.

Continuing to refer to FIG. 9, the mobile phone 1 may project a blank image 11e on surface 12. Possibly the blank image 11e includes one or more control buttons 15a, 15b, 15c that may be operated by touching them, as was described above, to cause respective functions to be carried out. A user may draw a picture, character, text, numbers, or virtually anything (collectively referred to as "picture") in the area of the blank image; and the camera may sense that picture and capture it for storage in the memory 23 or for other use. For example, the picture may be transmitted in a message, email, beaming, radio frequency, Blue Tooth, etc. to another device, to a network, etc. Writing directly on the screen 3 may be difficult because the screen usually is rather small compared to the possibly larger size of the projected image. Thus, it is easier to draw, write, etc. using the moving finger technique or the like described herein to create a picture in the projected image so that an image of the picture may be sensed and captured by the camera 2 and stored, used, etc. For example, a person may easily document his or her ideas and record the ideas in this very convenient manner that facilitates drawing, writing, etc. Also, the captured or stored image may be sent to another person for use by that other person, to facilitate having a discussion about an idea represented by the picture, etc.

Referring to FIG. 9 illustrates an exemplary logic diagram or computer flow chart (or routine) 50 for carrying out the function of projecting an image 11 (FIG. 1) by the projector 10, sensing a view of the projected image by the camera 2, determining whether a change has occurred to the image, and in response to a change carrying out a function of the mobile phone 1. The steps described with respect to the flow chart 50 of FIG. 9 may be carried out using the projector 10, camera 2, and the operating circuitry 7 of the mobile phone 1, for example.

At step (sometimes referred to as a "block") 51 the routine or flow chart 50 starts, e.g., in response to the mobile phone being turned on (powered up) and the visual laser touchpad function being selected by the user of the mobile phone. At step 52 an image is projected by the projector 10 (FIG. 1). In the examples below, the projected image is an image of a keypad 6a (FIG. 2); but it will be appreciated that other images representing various functions described above and others may be projected. The image may be projected onto a surface 12 (FIG. 1) or appropriately is projected so the image can be viewed by a user and sensed by the camera 2 (FIG. 1) and so that the image can be changed, e.g., by moving a finger, stylus or other object to a location in the projected image.

At step 53 a view of the projected image is sensed by the camera 2 (FIG. 1). That image may be stored for future use in a short term buffer memory or in a longer term memory, etc. At step 54 the flow chart or method waits for a period of time prior to further sensing a view of the projected image by the camera. The waiting time may be long or short or may be substantially non-existent, as may be desired. The waiting time allows for someone to change the view of the projected image 11, e.g., by inserting a finger into the projected image and touching a location on the projected image, for example, touching a key on a projected keypad 6a image. After the wait time has expired, then at step 55 a further sensing of the projected is done by the camera 2.

At step 56 an inquiry is made whether the image sensed by the camera had changed between the two sensing steps 53 and 55. If no change was found, then a loop is followed back to the wait step 54, and after the wait period has timed out further sensing of the view of the projected image is sensed again by the camera 2. If at step 56 it is found that there had been a change in the image, then at step 57 a to determination of what had changed between the images. After that determination has been made, then at step 58 a determination of what input should be made to the mobile phone or to the operating circuitry 7, etc., based on the change in the image. For example, if the change is indicative of a user pointing to a specific key of a keypad 6a, then a signal may be provided to the operating 7 representative of that key, such as, a numeral in a telephone number, the initiating of a telephone call or answering of a telephone call, etc. At step 59 such input is applied to the mobile phone, e.g., by providing the input to the operating circuitry 7.

At step 60 an inquiry is made whether the routine 50 had ended or should end, e.g., had all the digits for a telephone number been entered for dialing. If the routine is not complete and should not yet end, then a loop is followed back to step 53 and the flow chart 50 continues as was described above. If the routine is to end, e.g., all digits of a telephone number had been entered and a dialing function key to initiate a telephone call had been pressed (or pointed to), then the routine 50 moves to step 61 where the given function, e.g., dialing of the telephone number, is carried out by the mobile phone 1.

Referring to FIG. 10, an exemplary logic diagram or computer flow chart (or routine) 65 for carrying out the function of determining whether a sensed view of the projected image has been changed is illustrated. Several of the steps in the routine 65 are similar to or the same as steps in the flow chart 50 of FIG. 9, as will be evident from the following description. It will be appreciated that one example of digital imaging uses a group of pixels to form the image. In the routine 65 pixels in respective images are compared to determine whether a sensed image has changed and what is the nature or character of that change. Based on the nature or character of the change a particular signal may be provided the mobile phone to carry out a given function, etc., e.g., as was described above.

At step 66 pixel information of an image is sensed, e.g., by the camera 2. Pixel information may be gray scale of a pixel, color of the pixel, etc. At step 67 the routine waits, e.g., as in the wait 54 described above. At step 68 pixel information of the next sensed image is obtained. At step 69 a comparison is made between pixels of an image and pixels of the next (or another succeeding) image. At step 70 an inquiry is made whether there are differences between the respective corresponding pixels of the compared images, e.g., respective pairs of pixels or groups of pixels in the same respective locations of the respective images. If the image has not changed, then a loop back to the wait step 67 is followed and the flow chart 65 flows from there as illustrated and described. If the image has changed as determined at step 70, then at step 71 the routine identifies which pixels have changed. Such identification may be done by simply determining which pixels in the succeeding image are different from pixels in the prior image obtained at step 66. At step 72 the function represented by the identified pixels from step 71 are used to look up the function that such change is supposed to affect in the mobile phone. For example, if the function is the pressing of the key representing the number six in the projected image of a keypad 6a, then that digit is entered in a telephone number string. If the function is the dialing of a telephone number, then a signal representing that function is provided the operating circuitry, which then causes the mobile phone to dial the phone number, etc. At step 73 such function that had been found during the looking up in step 72 would be carried out by the mobile phone 1, for example.

Referring to FIG. 11, an exemplary logic diagram or computer flow chart (or routine) 80 for carrying out the function of drawing or writing on an image is illustrated. At step 81 an image is obtained from memory 23, from the camera 2, or from some other source, and the image is projected by the projector 10, e.g., to form a projected image on the surface 12 (FIG. 1). At step 82 there is a wait time to allow for the projected image to be changed, e.g., by a person "writing" on the projected image by moving a finger to and/or over one or more locations in the projected image. At step 83 the next image sensed by the camera 2 is obtained; and at step 84 the previously obtained image and the succeeding obtained image are compared, e.g., as was described with respect to FIG. 10.

At step 85 an inquiry is made whether the images the latest image has been changed relative to the image obtained at step 81 or relative to another previously obtained image. If not, then a loop is followed back to the wait step 82, and the routine 80 flows as described just above until it is determined that the images are different, e.g., someone has written or otherwise changed the projected image, for example by writing on or drawing on the image.

If at step 85 it is determined that the images are not the same, then at step 86 a mark, line or other writing is applied to the projected image by the operating circuitry 7. If a sequence of marks is made in the form of a line, e.g., by a person moving his or her finger across the projected image at the surface 12 or otherwise in the path of the projected image so that the camera 2 can sense to respective positions of the finger, then a line is drawn across the projected image in the mobile phone by the operating circuitry 7; and such image may be captured and stored, e.g., in memory 23. Therefore, at step 87 an inquiry is made whether the drawing or writing on the image had been completed. If not, then loop is followed back to step 82 and the routine 80 follows as described above. If the drawing or writing has been completed, then the image as modified is captured and stored at step 88. At step 89 an inquiry is made whether to send the image to one or more others, e.g., via Blue Tooth, radio frequency, SMS, MMS, beaming, etc. If yes then the image is transmitted or sent to another, and the routine 80 ends at step 91. If the answer at inquiry 89 is no, then the routine ends at step 91.

The above logic diagrams 50, 65 and 80 are exemplary. The mobile phone 1 with the features described herein may be operated in many different ways to obtain the functions and advantages described herein.

It will be appreciated that portions of the present invention can be implemented in hardware, software, firmware, or a combination thereof. In the described embodiment(s), a number of the steps or methods may be implemented in software or firmware that is stored in a memory and that is executed by a suitable instruction execution system. If implemented in hardware, for example, as in an alternative embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in flow charts may be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The logic and/or steps represented in the flow diagrams of the drawings, which, for example, may be considered an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The above description and accompanying drawings depict the various features of the invention. It will be appreciated that the appropriate computer code could be prepared by a person who has ordinary skill in the art to carry out the various steps and procedures described above and illustrated in the drawings. It also will be appreciated that the various terminals, computers, servers, networks and the like described above may be virtually any type and that the computer code may be prepared to carry out the invention using such apparatus in accordance with the disclosure hereof.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

We claim:

1. Portable electronic equipment, comprising
a projector adapted to project an image onto a surface relatively separate from the portable electronic equipment so that the image can be viewed,
a sensing device adapted to sense views including a view of a projected image by the projector, and
a control adapted to respond to a change in the sensed view of the projected image to provide an input to the portable electronic equipment, wherein:
the control individually compares each pixel in the sensed view to a correspondingly located pixel in a previously sensed view in order to detect one of whether an object is present in the sensed view that was not present in the previously sensed view or whether an object present in the previously sensed view has moved relative to a position of the object previously sensed.

2. The portable electronic equipment of claim 1, comprising a mobile telephone including a radio adapted to transmit and receive communications.

3. The portable electronic equipment of claim 2, wherein the mobile telephone includes a housing, the housing at least partly containing the radio, the projector, a camera and the control.

4. The portable electronic equipment of claim 1, said projector comprising a laser projector.

5. The portable electronic equipment of claim 1, wherein said control is adapted to sense a change representative of an object presented in the path of the projected image.

6. The portable electronic equipment of claim 1, wherein said sensing device is a camera.

7. The portable electronic equipment of claim 1, wherein said control is adapted to cause the projector to project an image representative of the result of an object being present and/or being moved.

8. The portable electronic equipment of claim 1, further comprising a display, said display comprising a touch sensitive display.

9. The portable electronic equipment of claim 1, further comprising a display, wherein the control is operable to show on the display the result of the change in the sensed view, and wherein the control is adapted to cause the projector and the display to provide the same image.

10. The portable electronic equipment of claim 1, wherein the projected image includes an image of at least one control button, and wherein the control is responsive to sensing of an object touching an image of the control button to provide an operative response thereto.

11. The portable electronic equipment of claim 1, wherein the control or the sensing device is adapted to capture a projected image, and wherein the control is adapted to transmit the captured image for receipt by another portable electronic equipment.

12. The portable electronic equipment of claim 1, wherein the control is adapted to detect a change in the sensed view based on manual input by one or more persons.

13. The portable electronic equipment of claim 1, wherein the image is a map and the change to the map represents applying information to the map image.

14. The portable electronic equipment of claim 1, wherein the change in the projected image is a character written on the projected image, and wherein the control includes a decoder to recognize the character.

15. The portable electronic equipment of claim 14, further comprising messaging function in the portable electronic equipment and the control is operable to include the character in a text message.

16. A method of using a portable communication device, comprising
- projecting an image onto a surface that is relatively separate from the portable communication device so that the image can be viewed,
- using a sensing device of the portable communication device to sense views including a view of a projected image by the projector, and
- detecting a change in the sensed view of the projected image to provide an input to the portable communication device including:
  - comparing each pixel in the sensed view to a correspondingly located pixel in a previously sensed view in order to detect one of whether an object is present in the sensed view that was not present in the previously sensed view or whether an object present in the previously sensed view has moved relative to a position of the object in the previously sensed view.

17. The method of claim 16, comprising manually touching the projected image to provide an input to the portable communication device.

18. The method of claim 16, comprising using a camera as the sensing device and capturing the image sensed by the camera, and further comprising writing on the image and transmitting the image, including the writing, as sensed by the camera to another device.

19. The method of claim 16, comprising writing a character on the projected image, and using a camera as the sensing device to capture the changes in the image.

20. The method of claim 19, further comprising recognizing the character and placing it in a text input field of a document, and wherein the document is an electronic document capable of being at least one of displayed or printed.

* * * * *